United States Patent [19]
Jenkins et al.

[11] Patent Number: 5,259,306
[45] Date of Patent: Nov. 9, 1993

[54] LAMINATOR FOR PROVIDING UNIFORM PRESSURE DISTRIBUTION

[75] Inventors: Stephen Jenkins, Bradford, United Kingdom; Peter Ulrich, Rodgau, Fed. Rep. of Germany; Gary Jones, Halifax, United Kingdom

[73] Assignee: E. I. Du Pont de Nemours and Company, Wilmington, Del.

[21] Appl. No.: 876,944

[22] Filed: May 1, 1992

[30] Foreign Application Priority Data

May 2, 1991 [DE] Fed. Rep. of Germany ....... 4114313

[51] Int. Cl.⁵ .............................................. B30B 3/04
[52] U.S. Cl. ............................ 100/160; 100/162 B; 100/168; 100/171; 156/582
[58] Field of Search ............... 100/160, 162 B, 168, 100/169, 171; 72/241.2, 241.6, 242.2; 156/582

[56] References Cited

U.S. PATENT DOCUMENTS

| | | | |
|---|---|---|---|
| 864,660 | 8/1907 | Love | 100/160 |
| 1,670,894 | 5/1928 | Lorczak | 100/160 |
| 1,824,211 | 9/1931 | Jobke | 72/241.4 |
| 2,718,827 | 9/1955 | Whittum | 100/162 B X |
| 2,800,012 | 7/1957 | Goetz et al. | 100/160 X |
| 2,851,869 | 9/1958 | Quoos et al. | 100/160 X |
| 3,190,100 | 6/1965 | O'Brien | 100/160 X |
| 3,736,869 | 6/1973 | Motter et al. | 100/162 B X |
| 3,991,669 | 11/1976 | Cumbers | 100/162 B |
| 4,127,066 | 11/1978 | Sharkey | 100/168 X |
| 4,142,386 | 3/1979 | Dokoupil | 100/160 X |
| 4,603,569 | 8/1986 | Sendzimir . | |
| 4,843,673 | 7/1989 | Sendzimir et al. | 100/171 X |
| 5,029,310 | 7/1991 | Sakaida et al. | 100/160 X |
| 5,057,860 | 10/1991 | Suzuki | 100/160 X |
| 5,154,117 | 10/1992 | Didelot | 100/160 X |
| 5,155,010 | 10/1992 | Sandner | 100/162 B X |
| 5,168,752 | 12/1992 | Konermann et al. | 73/150 R |

FOREIGN PATENT DOCUMENTS

| | | |
|---|---|---|
| 2047851 | 1/1992 | Canada . |
| 0066527 | 12/1982 | European Pat. Off. . |
| 947065 | 8/1956 | Fed. Rep. of Germany . |
| 970383 | 9/1958 | Fed. Rep. of Germany . |
| 1076611 | 3/1960 | Fed. Rep. of Germany . |
| 1111003 | 7/1961 | Fed. Rep. of Germany . |
| 3208013 | 10/1982 | Fed. Rep. of Germany . |
| 2214008 | 8/1974 | France . |
| 60-196206 | 10/1985 | Japan . |
| 1065028 | 4/1967 | United Kingdom . |

Primary Examiner—Stephen F. Gerrity

[57] ABSTRACT

A laminator with two rollers forming a roller nip, one of the rollers being subjected to pressure produced by a force-generating device, with a movable supporting element applying pressure perpendicular to a plane passing through the roller nip and evenly distributed over the length of the roller, the other roller being supported over its length by bearing elements attached to an adjustably flexible bracket.

8 Claims, 2 Drawing Sheets

LAMINATOR FOR PROVIDING UNIFORM PRESSURE DISTRIBUTION

BACKGROUND OF THE INVENTION

1. Field of the Invention

The subject of the invention is a laminator and, in particular, a laminator for applying pressure perpendicular to a plane passing through a nip between a pair of rollers.

2. Description of Related Art

Laminators are used, for example, to make color separations for a multicolor print. In this use, an image-bearing support, which has a tacky surface in areas to be colored, is passed through a roller nip together with a color-bearing-film having a color layer in contact with the image-bearing film. Two rollers forming the nip press the color-bearing film and the image-bearing film together. The color is transferred from the color-bearing film and sticks on the tacky areas of the image-bearing film.

In this process, it is important not only to generate a relatively high pressure, but also to distribute this pressure uniformly over the length of the roller nip, that is, over the longitudinal length of the rollers. The forces produced in the roller nip flex the rollers. This flexing leads to an uneven distribution of pressure in the roller nip, so that, for example, a different pressure is exerted at the ends than at the middle of the nip. This produces color separations with non-uniformities that can be mistaken for flaws in the color separations.

Attempts have been made to prevent roller flexing. In a configuration disclosed in U.S. Pat. No. 4,127,066, the lower roller forming the nip is attached immovably in a frame, while the upper roller is supported in bearings that can be shifted vertically in the frame. A pair of supporting rollers acts from above on the upper roller, the supporting rollers being housed in an auxiliary frame joined to the main frame through a screw spindle. Rotation of the screw spindle increases or decreases pressure by the supporting rollers on the upper roller and thereby the pressure in the nip. However, with long rollers, the supporting roller must be correspondingly long, thus running the risk that the supporting roller may be flexed. The application of force on the upper roller occurs essentially in the region of the two bearings of the supporting rollers, leading to a W shape in the roller nip with a correspondingly uneven pressure distribution.

Relatively short rollers undergo practically no detectable bending, but it has been found that webs passed through the nip drift, that is, without auxiliary measures, their travel path deviates from a direction perpendicular to the longitudinal axis of the nip. In particular, this can lead to crease formation at the edges of the film. Crease formation is not acceptable in the production of color separations, because, when a crease occurs, the desired color transfer is no longer assured, particularly if several colors, usually four, must be applied similarly to produce the color separations.

SUMMARY OF THE INVENTION

The invention involves the problem of providing a laminator that substantially reduces the risk of film drift, with the greatest possible uniformity in pressure distribution.

The problem is solved by a laminator with two rollers forming a roller nip, one of the rollers being subjected to pressure produced by a force-generating device, with a movable supporting element applying pressure perpendicular to a plane passing through the roller nip and evenly distributed over the length of the roller, the other roller being supported over its length by bearing elements attached to an adjustably flexible bracket.

The bearing elements arranged on the bracket automatically follow the curvature of the bracket. Consequently, the roller backed by the bearing elements can be flexed to this curvature, if the roller is subjected to a corresponding force from the opposing roller. This force is applied by the force-producing device that transmits the pressure through the supporting elements onto the opposing roller. To follow the curvature, the supporting elements are movable in a plane perpendicular to the plane passing through the roller nip. Therefore, the new laminator has a roller nip that is not completely planar, but rather has a curvature determined by the curvature of the bracket. Because the supporting elements that produce the pressure are distributed evenly over the length of the roller, this assures that an even distribution of pressure prevails, despite the curvature in the roller nip. The curvature results in automatically centering the sheets passing through the roller nip. The evenly distributed supporting elements produce an evenly distributed pressure in the roller nip, so that high quality color separations can be obtained.

The supporting elements and the bearing elements are preferably staggered with respect to each other. This makes the pressure distribution in the roller nip more uniform.

In another advantageous embodiment, the supporting elements and/or the bearing elements consist of pairs of rolls, one roll positioned before and one roll beyond a plane running through the axles of both laminator rollers. Thus, the rollers are supported not only in a direction perpendicular to the plane through the roller nip, but also accommodate forces acting in the direction of the travel path of the sheets (or in the opposite direction), the so-called shear forces. Such types of forces can be applied, for example, by the sheets. These forces are naturally less significant than the forces generating pressure in the roller nip. As a result, the curvature of the rollers can be more accurately adjusted. It then runs solely in a plane in which both roller axes also lie.

The bracket is preferably braced in a frame by a variable length strut. The variable length strut defines the peak of the curvature of the bracket and thus, of the roller nip. The curvature can also be adjusted by varying the length of the strut.

The preferred form of the variable length strut is a screw spindle that can be rotated in a threaded device attached to the frame. The screw spindle is affixed to the bracket in a rotatable manner. Rotating the screw spindle increases or decreases the space between the bracket and the frame, that is, the effective length of the strut is changed. The screw device enables a relatively fine translation of rotary motion into linear motion, so that the flexing of the bracket can be adjusted very finely and with high accuracy.

It is preferable for the bracket to be on a frame crossbar with many times greater flex resistance than the bracket. Thus, a change in the length of the strut changes only the flexing of the bracket. Flexing in the crossbar can be disregarded, because it is negligible on the basis of great flex resistance of the crossbar compared to the flexibility of the bracket.

The supporting elements are advantageously arranged in pairs on double-arm levers of a balance beam type. The double-arm levers can be pivoted on an axis lying in a plane running between the supporting elements and located on a base that can be subjected to pressure. Inasmuch as the supporting elements are not arranged rigidly in a line next to one another, but rather, on the double-arm levers of the balance beam type, they can follow the curvature of the roller. Nevertheless, each supporting element can transmit the same proportion of pressure. This achieves an even distribution of pressure in the entire roller nip despite the curvature of the rollers.

It is also preferable that two double-arm levers be spaced apart from each other on a support lever forming the base. The support lever can be pivoted on an axis lying in a plane running between the two double-arm levers, with the axis being connected to the force-generating device. This configuration is particularly preferred for long rollers. In this case, the individual supporting elements can press against the roller, even a curved roller, with relatively even distribution of force. Consequently, the pressure in the roller nip can be very uniform.

The preferable form of the force-generating device has a plunger supported on the edge of an eccentric rotatable disk. When the eccentric disk is rotated, the plunger is raised and lowered, that is, it moves towards and away from the roller nip. The eccentric disk enables the plunger to move a relatively long distance and consequently, a correspondingly long path of travel is possible for the supporting elements. By this means, a roller is lowered and the roller nip is opened. The force that can be applied to the plunger and therefore the pressure prevailing in the roller nip depends on the rotary torque driving the eccentric disk and the uplift of the edge of the eccentric disk relative to a cylinder surface.

A spring system is preferred between the plunger and the base. The spring system is ultimately decisive for the pressure prevailing in the roller nip.

In this embodiment, it is preferable that the spring system have two disk springs with adjustable initial tension. The initial tension of the disk springs is critical for the pressure prevailing in the roller nip.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
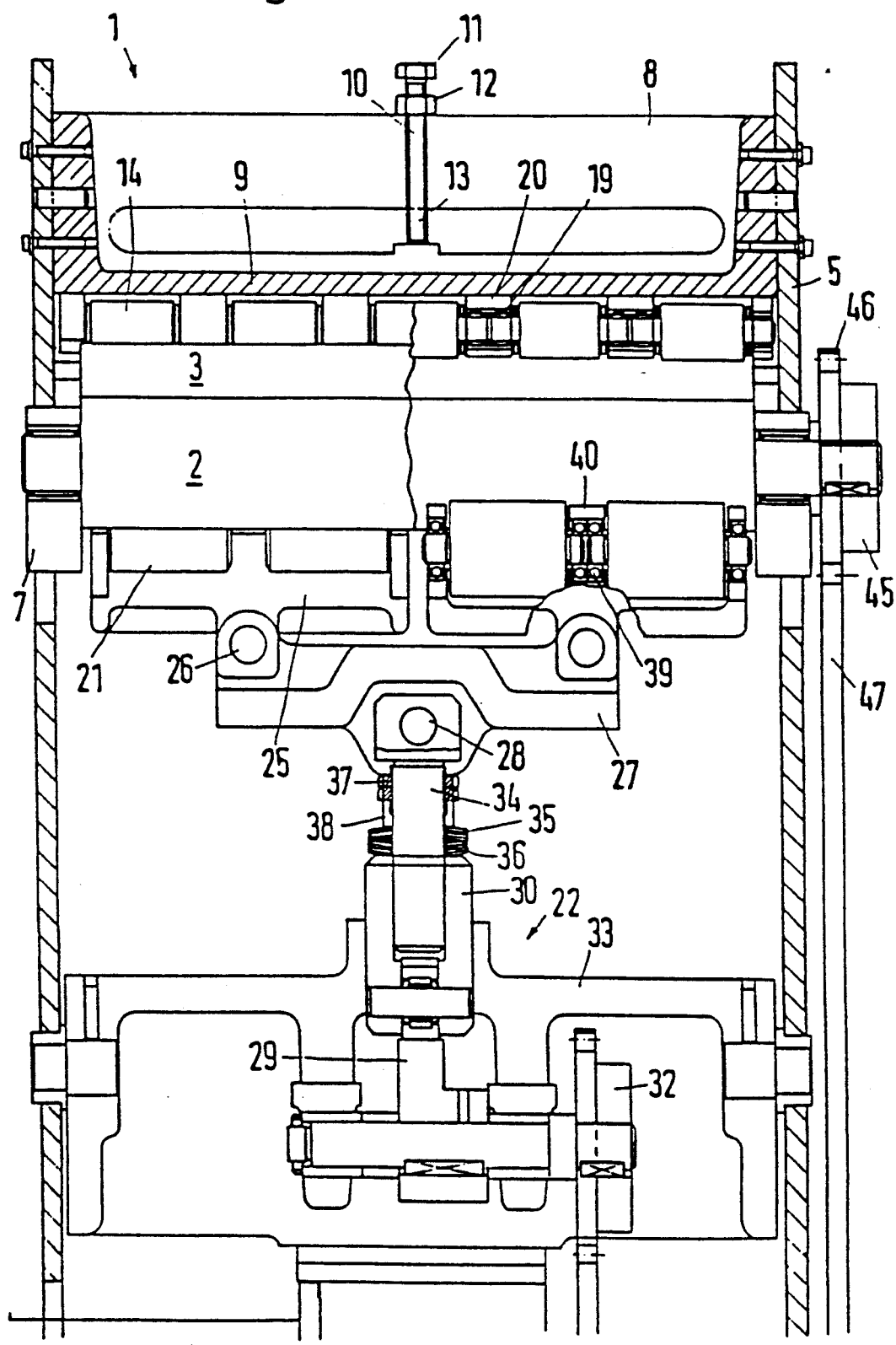
FIG. 1 is a front view of a laminator, partially cutaway vertically.

A laminator 1 has a roller 2 and an opposing roller 3, which together form a roller nip 4. Roller 2 and opposing roller 3 are positioned within a frame 5 that is part of a housing 6. The roller 2 is supported in bearings 7 that are located in frame 5 and are vertically movable. The opposing roller 3 is supported directly in frame 5 in a manner which prevents vertical movement of the opposing roller 3 with respect to the frame 5 and which is not shown in detail.

The frame 5 has a crossbar 8. A bracket 9 is located below the crossbar 8. The bracket 9 has a screw spindle 10 with a grip 11 for rotation, for example, a hexagonal head. The screw spindle 10 is guided into a threaded device 12 affixed to the crossbar 8. When the screw spindle grip 11 is rotated, the length of a segment 13 of the screw spindle extending freely between the crossbar 8 and the bracket 9 is changed. The segment 13 thus forms a variable length support. The bracket 9 is significantly less flexible than the crossbar 8. A change in the length of the segment 13 of the screw spindle 10 also results in flexing the bracket 9. Curvature of the crossbar 8 can be disregarded as being negligibly small.

Five bearing elements 14 are positioned below the bracket 9 and distributed along the length of the opposite roller 3. Each bearing element 14 consists of a pair of bearing rolls 15, 16. The rolls 15, 16 are arranged on both sides of a plane through axes 17, 18 of the roller 2 and the opposing roller 3. The bearing rolls 15, 16 are supported in needle bearings 19 enclosed in bearing blocks 20. The bearing blocks 20 are attached directly to the bracket 9. If the bracket 9 is now flexed by a change in the length of the segment 13 of the screw spindle 10, the bearing elements 14 essentially follow this line of curvature. As soon as a force is exerted on the opposing roller 3 and produces a curvature in the opposing roller 3, the opposing roller 3 is flexed until it contacts all of the bearing elements 14. This can also define a line of curvature in the opposing roller 3.

The force on the opposing roller 3 is applied through the roller 2. Force is also applied by a device 22 that generates force on the roller 2 through supporting elements 21. Each supporting element 21 consists of a pair of supporting rolls 23, 24 arranged on both sides of the axes 17, 18 running through the roller 2 and the opposing roller 3. The supporting elements 21 are arranged in pairs on a double-arm lever 25. The double-arm lever 25 can be rotated like a balance beam at a point of rotation 26. The point of rotation 26 is positioned in a plane extending between the two supporting elements 21 forming the pair of roles 23, 24. It can be located below the supporting elements 21. If the roller 2 flexes because of the force applied by the force-generating device 22, the supporting elements 21 can follow this curvature. Thus, the force is evenly distributed on the roller 2. This prevents the generation of higher pressure in the roller nip 4 in the areas where the roller 2 is less flexed. The supporting elements 21 are borne on ball bearings 39 enclosed in bearing boxes 40 attached to the double-arm levers 25.

The preceding embodiment has two double-arm levers 25 positioned together on a supporting lever 27 serving as the base for the point of rotation 26. The supporting lever 27 is also pivotable around a point of rotation 28 like a balance beam. The point of rotation 28 is positioned in the force-generating device 22.

The force-generating device 22 has an eccentric disk 29 whose edge supports a plunger 30 by means of a rotor 31. The eccentric disk 29 can be driven by a drive wheel 32 rotated by a drive not shown in detail, for example, a chain drive. The plunger 30 is housed in a bearing 33 so that it can be moved towards and away from the roller nip 4.

The plunger 30 contains a push rod 34 that can be moved in the plunger 30 against the force of a spring assembly comprising two disk springs 35, 36 on the plunger 30. The point of rotation 28 is located on the end of the push rod 34 projecting from the plunger 30. The disk springs 35, 36 can be given an initial tension with the aid of one of the nuts 37 screwed on the threads on the outside of the push rod 34 and an initial tension device comprising a spacer 38. The initial tension of the disk springs 35, 36 is critical for the pressure that can be produced in the roller nip 4 with the aid of the force-generating device 22. To process an image bearing film with a color-bearing film, a sheet guide device 41, 42 is provided, extending from an entrance 43 in the housing 6 to the roller nip 4 and from the roller nip 4 to an exit 44 in the housing 6.

Figure 2:
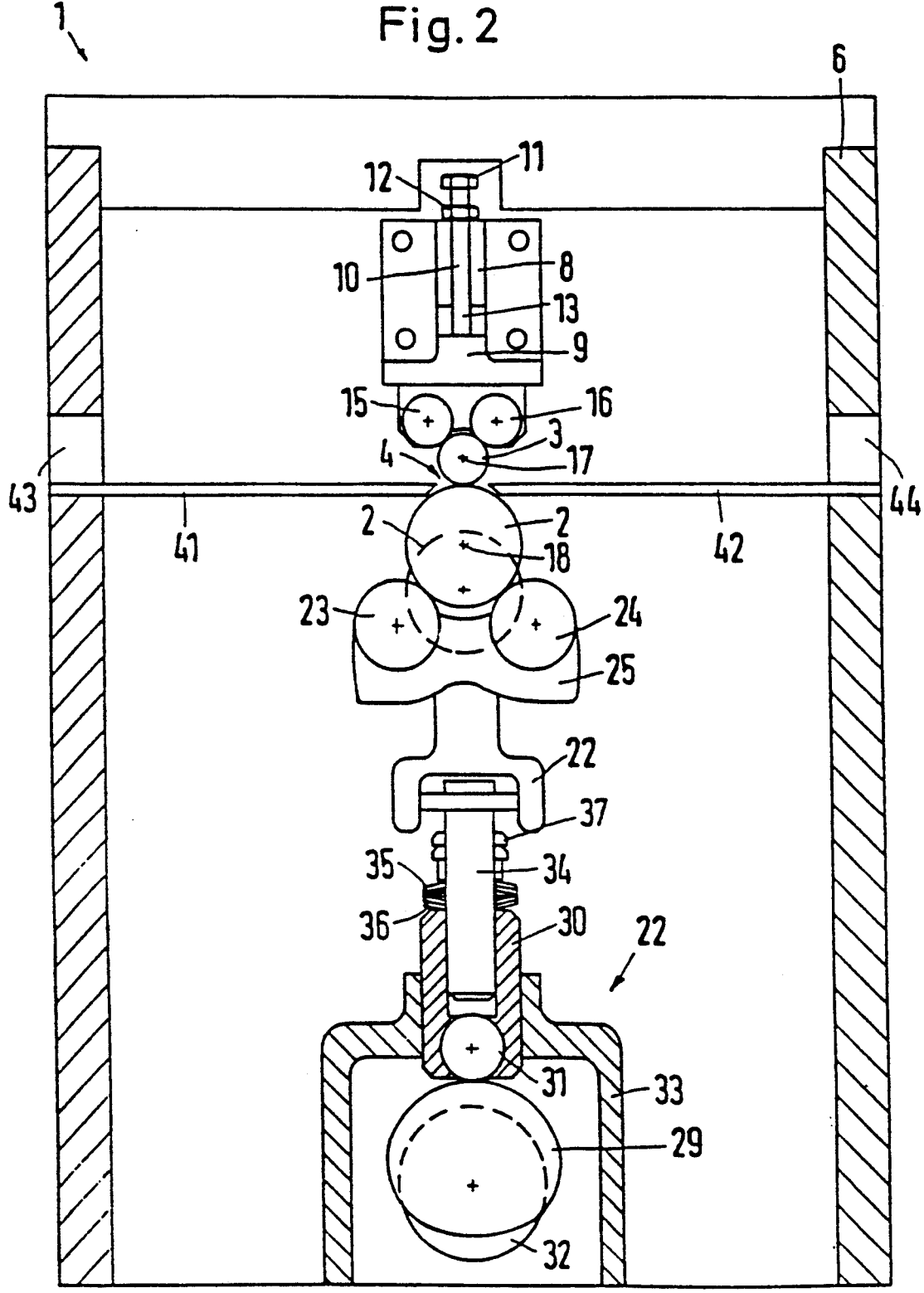
FIG. 2 is a side view of the laminator, partially cutaway vertically.

The laminator 1 operates as follows. Before a film combination comprising an image-bearing film and a color-bearing film is passed into the laminator 1, the eccentric disk 29 is rotated. This lowers the roller 2 to the position 2' indicated by dashes in FIG. 2. The roller nip 4 is thus opened. The film combination can be fed in the entrance 43 and forwarded on the sheet guide 42. It is, of course, also possible to have the color-bearing film ready in the roller nip 4 and to feed in only the image-bearing film. As soon as the film combination is located in the roller nip 4, the roller 2 is raised by the rotation of the eccentric disk 29 and the roller nip 4 is closed. The technician, knowing the film combination and the roller nip pressure required for satisfactory color transfer, has previously adjusted, with the aid of the nuts 37, the pressure produced in the roller nip 4. In addition, the technician has previously adjusted, with the aid of the screw spindle 10, the curvature of the opposing roller 3 and thereby, the resulting curvature of the roller 2. As soon as the roller nip 4 is closed, rotation of the roller 2 and the opposing roller 3 is started, for example, by a gear drive 45, 46 actuated by a motor, not shown, and a chain drive 47. The film combination in the roller nip 4 is forwarded by the rotation of the roller 2 and the opposing roller 3 and simultaneously subjected to pressure so that color is transferred in the roller nip 4 from the color-bearing film to the image-bearing film and thus eventually over the entire length of the film segment being processed.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A laminator, comprising:
   a housing:
   two rollers rotatably supported by the housing, the rollers forming a roller nip;
   a force-generating device adapted to subject one of the rollers to pressure, the force-generating device comprising a movable supporting element adapted to apply pressure perpendicular to a plane passing through the roller nip and substantially evenly distributed over the length of the one roller;
   bearing elements supporting the other roller over its length;
   an adjustably flexible bracket attaching the bearing elements to the housing;
   a variable length strut supporting the bracket; and
   a crossbar supporting the bracket in the housing, the crossbar with greater flex resistance than the bracket.

2. The laminator in accordance with claim 1, wherein the movable supporting element is one of a plurality of movable supporting elements and at least one of the supporting elements and the bearing elements are pairs of rolls with one of each pair of the rolls being positioned on a first side and the other roll of each pair of the rolls positioned on a second side of a plane running through roller axes of the two rollers.

3. The laminator in accordance with claim 1, wherein the variable length strut is a screw spindle.

4. The laminator in accordance with claim 1, wherein the movable supporting element is one of a plurality of movable supporting elements and the supporting elements are arranged in pairs on double-arm levers of the balance beam type, each one of the levers being pivotable on a respective axis lying in a plane running between the pair of the supporting elements, each of the axes being positioned on a base that can be subjected to pressure by the force-generating device.

5. The laminator in accordance with claim 4, wherein two of the double-arm levers are spaced apart from each other on a support lever forming the base, the support lever being pivotable about an axis lying in a plane running between the two double-arm levers and being joined with the force-generating device.

6. A laminator, comprising:
   a housing:
   two rollers rotatably supported by the housing, the rollers forming a roller nip;
   a force-generating device adapted to subject one of the rollers to pressure, the force-generating device comprising a movable supporting element adapted to apply pressure perpendicular to a plane passing through the roller nip and substantially evenly distributed over the length of the one roller, the force-generating device having a plunger;
   bearing elements supporting the other roller over its length;
   an adjustably flexible bracket attaching the bearing elements to the housing; and
   a rotatable eccentric disk having a periphery supporting the plunger such that when the eccentric disk is rotated, the plunger is moved towards or away from the roller nip thereby causing the force-generating device to apply or reduce pressure perpendicular to the plane passing through the roller nip and substantially evenly distributed over the length of the one roller.

7. The laminator in accordance with claim 6, wherein the force-generating device further comprises a spring system with an adjustable initial tension located between the plunger and the movable support element, the plunger movable against the force of the spring system and the initial tension controlling the pressure that can be produced in the roller nip.

8. The laminator in accordance with claim 7, wherein the spring system has two disk springs with adjustable initial tension.

* * * * *